(12) United States Patent
Smørholm

(10) Patent No.: US 7,732,001 B2
(45) Date of Patent: Jun. 8, 2010

(54) EDIBLE EMULSIONS

(75) Inventor: Odd Smørholm, Bjerkreim (NO)

(73) Assignee: Bioli Innovation AS, Bjerkreim (NO)

( * ) Notice: Subject to any disclaimer, the term of this patent is extended or adjusted under 35 U.S.C. 154(b) by 689 days.

(21) Appl. No.: 10/547,162

(22) PCT Filed: Feb. 27, 2004

(86) PCT No.: PCT/GB2004/000797

§ 371 (c)(1), (2), (4) Date: Jul. 3, 2006

(87) PCT Pub. No.: WO2004/075647

PCT Pub. Date: Sep. 10, 2004

(65) Prior Publication Data

US 2007/0071876 A1   Mar. 29, 2007

(30) Foreign Application Priority Data

Feb. 28, 2003   (NO) .................................. 20030936

(51) Int. Cl.
*A23D 9/00* (2006.01)

(52) U.S. Cl. .................. 426/602; 426/330.3; 426/330.6

(58) Field of Classification Search .................. None
See application file for complete search history.

(56) References Cited

U.S. PATENT DOCUMENTS

| | | | |
|---|---|---|---|
| 3,903,310 A | | 9/1975 | Buide et al. |
| 3,950,547 A | * | 4/1976 | Lamar et al. .................. 426/74 |
| 4,963,380 A | * | 10/1990 | Schroeder et al. ........ 426/330.3 |
| 6,071,548 A | | 6/2000 | Hilhorst |
| 6,235,331 B1 | * | 5/2001 | Kataoka et al. .......... 426/330.6 |

FOREIGN PATENT DOCUMENTS

| | | |
|---|---|---|
| EP | 0398408 A2 | 11/1990 |
| EP | A1-440203 | 1/1991 |
| EP | 0999259 A1 | 5/2000 |
| GB | 1 044 623 | 10/1966 |
| GB | 1261910 | 1/1972 |
| JP | A-07135900 | 5/1995 |
| JP | A-07274807 | 12/1995 |
| JP | A-09140332 | 6/1997 |
| JP | A-10201417 | 10/1998 |
| JP | 2002-223698 A | 8/2002 |
| WO | WO 01/47377 A2 | 7/2001 |

(Continued)

OTHER PUBLICATIONS

Yanishlieva et al., European Journal of Lipid Science and Technology (Nov. 2001) vol. 103, No. 11, pp. 752-767 (Abstract).

(Continued)

*Primary Examiner*—Timothy M Speer
(74) *Attorney, Agent, or Firm*—Casimir Jones, S.C.

(57) ABSTRACT

The invention provides an edible oil-in-water emulsion concentrate comprising as a continuous aqueous phase a physiologically tolerable plant juice concentrate and a discontinuous phase comprising a physiologically tolerable, oxidation-labile unsaturated lipid or fatty acid, wherein the emulsion is produced by homogenization such that at least 95% by number of the droplets of said discontinuous phase have a particle diameter of no more than 10 micrometres.

16 Claims, 1 Drawing Sheet

50 μm

FOREIGN PATENT DOCUMENTS

WO     WO 02/070014     9/2002

OTHER PUBLICATIONS

Figure 1:
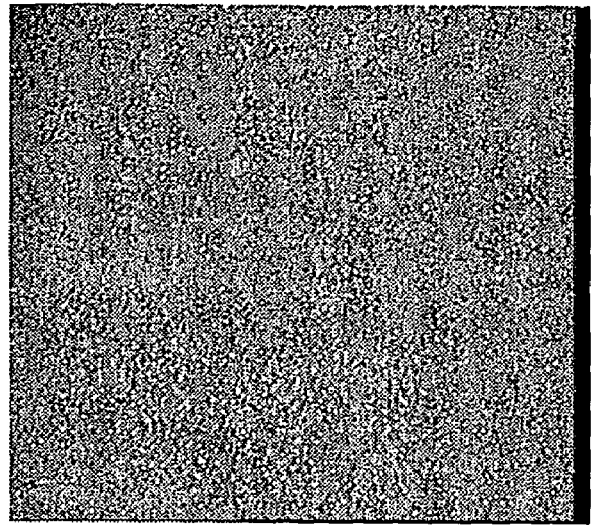

Gutierrez et al., Alimentaria 322:55-58 (2001) (Abstract).

Jacobsen et al., Oxidation in fish oil-enriched mayonnaise: 4. Effect of tocopherol concentration on oxidative deterioration, European Food Research And Technology, vol. 22, pp. 308-318 (2001).

English Language Translation of Abstract of Japanese Published Patent Application No. 2002-223698; Applicant: Asahi Denka Kogyo KK; Publication Date: Aug. 13, 2002; (1 pg.).

Nakaya, Kyuoko, et al.; "Effects of Droplet Size on the Oxidative Stability of Oil-in-Water Emulsions"; Lipids, vol. 40, No. 5 (May 2005); pp. 501-507; AOCS Press.

Frankel, Edwin N., et al.; "Interfacial Phenomena in the Evaluation of Antioxidants: Bulk Oils vs Emulsions"; J. Agric. Food Chem.; vol. 42 (1994) pp. 1054-1059; American Chemical Society; US.

Frankel, Edwin N.; "Lipid Oxidation"; The Oily Press, ISBN0951417193, vol. 10 (1998) pp. 129-160; Dundee, Scotland.

Evans, Everette I.; "Antioxidant Properties of Vegetable Lecithin"; Industrial and Engineering Chemistry, (Mar. 1935) pp. 329.

Faraji, Habibollah, et al.; "Characterization of the Antioxidant Activity of Sugars and Polyhydric Alcohols in Fish Oil Emulsions"; J. Agric. Food Chem.; vol. 52 (2004), pp. 7164-7171; American Chemical Society; US.

Faraji, Habibollah, et al.; "Antioxidant Protection of Bulk Fish Oils by Dispersed Sugars and Polyhydric Alcohols"; J. Agric. Food Chem.; vol. 53, (2005), pp. 736-744; American Chemical Society; US.

Jacobsen C., et al.; Abstract of Article: "Oxidation in fish oil-enriched mayonnaise: 4. Effect of tocopherol concentration on oxidative deterioration"; European Food Research and Technology; vol. 212, No. 3 (Feb. 2001), pp. 308-318; Springer-Verlag GmbH.

\* cited by examiner $\overline{50}$ μm $\overline{50}$ μm

EDIBLE EMULSIONS

The invention relates to edible oil-in-water emulsions having enhanced stability, in particular emulsions comprising in the oil phase an oxidation-labile unsaturated lipid or fatty acid, e.g. an unsaturated acylglycerol, and in the aqueous phase a concentrated plant juice, e.g. a fruit juice concentrate.

It is well known that unsaturated lipids and fatty acids, such as acylglycerols and other unsaturated hydrocarbyl lipids, are beneficial to the consumer, in particular acylglycerols in which the fatty acid residues are residues of $C_{16-24}$ unsaturated fatty acids such as for example docosatetraenoic acids (DTA), eicosapentaenoic acids (EPA), docosahexaenoic acids (DHA), linoleic acid, linolenic acids (LA), octadecatetraenoic acids, hexadecadienoic acids, hexadecatrienoic acids and hexadecatetraenoic acids. While such acylglycerols may be extracted from plant seeds, e.g. the seeds of evening primrose, a particularly convenient source is fish, especially fish liver.

However, as many readers will remember from their childhoods, cod liver oil is frequently foul-smelling and foul-tasting.

Indeed unsaturated lipids and fatty acids generally suffer problems of poor stability and compositions containing them are now generally formulated in capsule form so that the taste and smell is hidden from the recipient.

The stability problem with such lipids generally derives from their susceptibility to oxidation on contact with air, i.e. they are oxidation-labile.

The encapsulated formulations now prevalent however mean that the unsaturated lipid or fatty acid is administered in a form which the recipient perceives as "a medicine", i.e. something unpleasant or difficult to swallow. To improve compliance (i.e. regularity of uptake), there is therefore a need for compositions which contain the unsaturated lipid or fatty acid but which suffer neither from the organoleptic drawbacks of fish oil per se nor from the format of a medicine.

When unsaturated lipids are to be utilised in foodstuffs, nutraceuticals etc., it is common to start out with an "oil in water" emulsion. However, it is difficult to produce these types of emulsions with a long shelf life, particularly when they contain lipids of a marine source. The unsaturated fatty acid residues are exposed to oxidation/deterioration, and these can easily result in an unpleasant aftertaste for the foodstuff in which the emulsion is to be utilised. This problem has been described in a number of publications. See for example: Hartvigsen et al., J. Agric. Food Chem. 48: 4858-4867 (2000); Jacobsen et al., Eur. Food Res. Technol. 211: 86-98 (2000); Jacobsen et al., Eur. Food Res. Technol. 212: 308-318 (2001); Jacobsen, J. Agric. Food Chem. 49: 1009-1019 (2001); Almentaria 322: 55-58 (2001); Fluessiges Obst 65: 118 and 120-125 (1998); NO-B1-313076; Japanese patent publications JP-10201417, JP-11318375, JP-07274807, JP-36042659; and U.S. Pat. No. 6,235,331.

We have now surprisingly found that stable, organoleptically acceptable, oil-in-water emulsions of oxidation-labile unsaturated lipids and fatty acids may be prepared using concentrated plant juice as the aqueous phase. Such emulsions may be consumed as they are or after dilution or inclusion in other foodstuffs.

More particularly we have found that oxidation-stable and suspension-stable emulsion concentrates in which the taste or smell of the lipid component is undetectable or barely detectable may be prepared in this way. Such concentrates or diluted forms thereof may thus be administered without encapsulation.

Thus viewed from one aspect the invention provides an edible oil-in-water emulsion concentrate comprising as a continuous aqueous phase a physiologically tolerable plant juice concentrate and a discontinuous phase comprising a physiologically tolerable, oxidation-labile unsaturated lipid or fatty acid, wherein the emulsion is produced by homogenization such that at least 95% by number of the droplets of said discontinuous phase have a particle diameter of no more than 10 micrometres.

Particle size may be determined by photomicroscopy, e.g. at a magnification of about ×150 to ×250, with lipid particles too small to be seen by the naked eye in such photomicrographs being ignored.

In the concentrates of the invention, the plant juice concentrate is preferably one having a dry solids content of up to six times that of the unconcentrated plant juice, e.g. 5 to 6 times. The dry solids content of the aqueous phase is preferably at least 40% wt, more especially at least 50% wt, e.g. 50 to 70% wt. In an alternative definition of the concentrate of the invention herein, plant juice concentration of up to 6 times in terms of dry solids content may be replaced by having a dry solids content of at least 40% wt, e.g. 50 to 70% wt.

The lipid content of the concentrates of the invention is preferably at least 20% wt, e.g. up to 80% wt, more typically up to 55% wt, particularly 20 to 45% wt, especially 25 to 40% wt.

In the concentrates of the invention, the aqueous phase preferably comprises a concentrated fruit or vegetable juice; however the non-aqueous components of the aqueous phase may comprise materials other than those naturally occurring in plant juices, e.g. salts, sugars, carbohydrates, proteins, antioxidants, flavourings, preservatives, emulsifiers, viscosity modifying agents, pH modifying agents, protein hydrolysates, etc.

It is especially preferred that the concentrates contain protein hydrolysates, in particular fish protein hydrolysates.

In a particularly preferred embodiment, the aqueous phase may be prepared using fructose-rich materials, e.g. honey or high fructose corn syrup (HFCS). Indeed honey or HFCS may in one less preferred aspect of the invention be used in place of the plant juice concentrate.

While the aqueous phase may be a simple solution, it will generally and preferably be a dispersion containing non-dissolved matter, e.g. vegetable or fruit pulp, etc. It is preferable however that the dissolved matter content of the aqueous phase is at least 20% wt, especially at least 30% wt, e.g. 30 to 70% wt, preferably 30 to 50% wt. The dissolved matter will typically include carbohydrates and proteins, especially plant carbohydrates and proteins, vitamins and antioxidants. Particularly preferably, the plant-derived dissolved matter comprises at least 80% wt, more especially at least 90% wt of the total dissolved matter in the aqueous phase. Such plant-derived matter as is present in the concentrates of the invention may derive from a single plant species (e.g. a citrus fruit) or from two or more plant species (e.g. as in the vegetable juice drink sold under the trade name V8®).

Where the plant-derived matter derives from two or more plant species, such matter may comprise compounds extracted from plant material, e.g. lecithins or sugars, rather than unseparated plant juice. Likewise the aqueous phase may, as described above, contain dissolved or dispersed material of non-plant origin, e.g. of animal or mineral origin or synthetic compounds.

The plant juice concentrate used according to the invention is preferably a juice concentrate from berries and/or fruit, e.g. mango, tomato, beans, cereal seeds, cucumber, banana, apricot, grape, nuts, passion fruit, apples, pears, citrus fruit (such as orange, lemon, lime or grapefruit), or berries, e.g. woodland or garden berries such as blueberries, blackberries, cranberries, blackcurrants, redcurrants, or raspberries. Especially preferably it is citrus juice, more especially orange juice, concentrate. The concentrate may be in the form of a pourable liquid, but alternatively it may be in the form of a paste or purée, e.g. tomato purée. Such concentrates are readily available commercially, e.g. from Tine Meieri, Bergen, Norway. Typically such concentrates may be prepared by evaporation, freezing out of water, micro-filtration, etc. of plant juice obtained by pressing, crushing or squeezing.

Likewise, while the lipid content of the compositions of the invention preferably derives from natural (i.e. plant or animal or microorganism) sources, at least a portion thereof may be of synthetic or semi-synthetic origin. Preferably however at least 60% wt, more preferably at least 75% wt, especially preferably at least 95% wt is of plant or marine origin, especially marine origin (e.g. fish liver oil, especially cod or halibut liver oil, or fish body oil, especially herring, sand eel, sprat, anchovy, menhaden, capelin, salmon or trout oil).

If desired, up to 100% wt, more preferably up to 60% wt, particularly 10 to 30% wt of the lipid may be a conjugated linoleic acid (CLA, available from Cognis Corporation, USA) or an ester thereof, e.g. a mono, di or triacylglycerol.

Particularly preferably, the oil phase of the compositions of the invention comprises at least one omega-3 and/or omega-6 and/or omega-9 fatty acid or fatty acid ester, e.g. 9,12,15-octadecatrienoic acid (alpha-linolenic acid) [18:3, ω3]; 6,9,12,15-octadecatetraenoic acid (stearidonic acid) [18:4, ω3]; 11,14,17-eicosatrienoic acid (dihomo-alpha-linolenic acid) [20:3, ω3]; 8,11,14,17-eicosatetraenoic acid [20:4, ω3]; 5,8,11,14,17-eicosapentaenoic acid [20:5, ω3]; 7,10,13,16,19-docosapentaenoic acid [22:5, ω3]; 4,7,10,13,16,19-docosahexaenoic acid [22:6, ω3]; 9,12-octadecadienoic acid (linoleic acid) [18:2, ω6]; 6,9,12-octadecatrienoic acid (gamma-linolenic acid) [18:3, ω6]; 8,11,14-eicosatrienoic acid (dihomo-gamma-linolenic acid) [20:3, ω6]; 5,8,11,14-eicosatetraenoic acid (arachidonic acid) [20:4, ω6]; 7,10,13,16-docosatetraenoic acid [22:4, ω6]; 4,7,10,13,16-docosapentaenoic acid [22:5, ω6]; 6,9-octadecadienoic acid [18:2, ω9]; 8,11-eicosadienoic acid [20:2, ω9]; and 5,8,11-eicosatrienoic acid (Mead acid) [20:3, ω9]. More preferably the oil phase comprises at least one fatty acid or fatty acid ester selected from DHA, DTA, EPA, and LA, and esters thereof, especially the acylglycerols, in particular the triacylglycerols.

In general the lipid phase will contain more than one polyunsaturated fatty acid or esters of more than one polyunsaturated fatty acid, preferably esters of at least one omega-3 polyunsaturated fatty acid and at least one omega-6 polyunsaturated fatty acid.

Especially preferably the oil phase of the compositions of the invention comprises a purified, i.e. essentially taste and smell free, acylglycerol. Such materials may be provided by neutralization of the oil to remove free fatty acids, bleaching to remove pigments, and deodorization to remove volatiles. Such materials are commercially available, e.g. as Fish Oil 18/12 Ultra-Refined from Napro Pharma, or RO PUFA from Roche, or Denomega from Denofa, Fredrikstad, Norway, EPAX 3000 from Pronova, Norway, cod liver oil and salmon oil from Maritex, Norway, and tuna oil from NaproPharma.

The lipid phase preferably comprises or consists of oils selected from single cell organism derived oils (e.g. Dhasco or Arasco), fish oils (e.g. cod liver oil, salmon oil, tuna oil, menhaden oil, sardine oil, capelin oil, herring oil, halibut liver oil, shark liver oil, etc.), plant oils (e.g. evening primrose oil, borage oil, blackcurrant seed oil, etc.), plant, animal (including fish) or microorganism oil extracts (e.g. gamma linolenic acid, EPA, DHA or concentrates thereof), synthetic or semi-synthetic oils (e.g. conjugated linoleic acid), oils from genetically modified plants, animals or microorganisms, lipophilic vitamins, etc. In general, fish oils or fish oil concentrates or extracts are preferred.

As mentioned, the oil phase of the compositions of the invention may contain lipophilic materials besides acylglycerols, e.g. fat-soluble vitamins or nutrients; however acylglycerols will preferably constitute at least 80% wt of the oil phase, especially at least 95% wt. Typical further lipophilic materials include fatty acids (especially $C_{16-24}$ unsaturated fatty acids such as those mentioned above, in particular DHA, EPA, DTA, LA etc.), antioxidants, vitamins and surfactants.

The compositions of the invention desirably also contain an emulsifier. Any food-grade emulsifier may be used, e.g. monoglycerides, cyclodextrins, lecithins, etc. The use of lecithins, e.g. soya lecithins, is particularly preferred. Typically the emulsifier will be present as up to 15% wt, especially 1 to 12% wt, particularly 9 to 11% wt, relative to the overall emulsion. Appropriate lecithins are available for example as Denothin 62 from Denofa, Centrolex FP 30, Sternphil E-60, Precept 8160 and Ultralec P from MultiChem Wallinco, Oslo, Norway. Sternphil E-60 is especially preferred.

Emulsification to produce the concentrate of the invention may be effected using conventional homogenization apparatus, e.g. an Ultraturax blender or a Rannie high pressure blender. The use of a high pressure blender is preferred, e.g. operating at a pressure of 50 to 1000 bar, preferably 200 to 600 bar. Particularly preferably the emulsification is effected repeatedly (e.g. up to 20 times) so as to produce a small droplet size and a stable emulsion. It is particularly preferred to use a two stage preparation process involving blending, e.g. in an Ultraturax blender, followed by high pressure homogenization, e.g. using a Gaulin two-stage homogenizer (AVI Gaulin Corp., Wilmington, Del., USA) or a Microfluidizer Processor (Microfluidics Corporation, Newton, Mass., USA). If desired emulsification may be effected at an, or so as to reach an, elevated temperature, e.g. up to 70° C.

The concentrate of the invention may be stored or transported and remains stable.

Thus viewed from a further aspect the invention provides a sealed container, preferably having an internal volume of at least 1 L, more preferably at least 10 L, e.g. up to 100 L, containing the concentrate of the invention, preferably under an oxygen-free, e.g. nitrogen, atmosphere.

Before administration, the concentrate of the invention may be diluted with a physiologically tolerable aqueous liquid, e.g. water, diluted plant juice or other beverages. Such diluted forms are a further aspect of the invention. Viewed from a further aspect the invention thus provides a lipid-containing, ready-to-drink, plant juice composition produced or producible by diluting a concentrate according to the invention, e.g. to a dispersed lipid content of 0.5 to 2% wt, preferably 1 to 1.5% wt.

Viewed from a still further aspect the invention also provides a sealed container, preferably having an internal volume of at least 50 mL, e.g. up to 1 L, more preferably at least 10 L, e.g. up to 100 L, containing the ready-to-drink composition according to the invention preferably under an oxygen-free, e.g. nitrogen, atmosphere.

Such ready-to-drink compositions desirably also contain a protein hydrolysate, e.g. as a flavour enhancer. Dried protein hydrolysates are available commercially. Typical sources include microorganisms (e.g. yeasts) and fish.

The concentrate may also be used as a foodstuff ingredient, e.g. an ingredient in foodstuff such as jam, fruit compotes etc., in juice or other soft drinks containing fruit, as an ingredient in health foodstuff such as vitamin preparations etc., or as an additive/filling in natural stimulants such as chocolates, boiled sweets etc. For this use, the concentrate of the invention may desirably be in the form of a paste—such pastes may be formed naturally in producing the emulsion of the invention or may be produced by removal of water from preferred emulsions. As with the ready-to-drink compositions, such pastes may contain other components such as for example protein hydrolysates.

Viewed from a further aspect the invention thus provides a foodstuff containing or produced using a concentrate according to the invention.

The term foodstuff as used herein covers consumable nutrient containing materials, e.g. health food and health drinks, in particular materials containing nutrient ingredients besides the concentrate according to the invention.

Particularly suitable such foodstuffs according to the invention include milk, yoghurt, cheese, cheese spreads and other dairy products.

Figure 2:
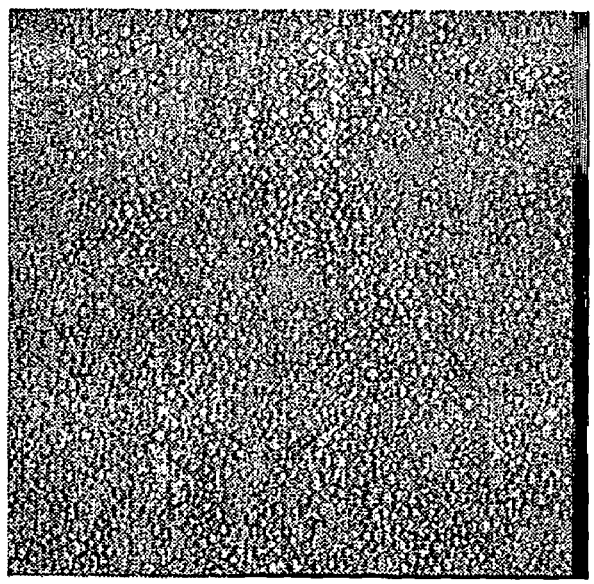

The invention will now be described further with reference to the following non-limiting Examples and the accompanying drawings in which:

FIG. 1 is a photomicrograph of a fish-oil/lecithin/orange juice concentrate containing emulsion according to the invention, containing 26% wt fish oil; and FIG. 2 is a photomicrograph of a fish-oil/lecithin/orange juice concentrate containing emulsion according to the invention, containing 45% wt of fish oil.

EXAMPLE 1

Refined fish oil, with an additive of 10 weight-% emulsifier approved for use in foodstuff, was mixed with a commercially produced concentrate of orange juice where the solid content was 6 times higher than in juice ready for consumption, i.e. a dry matter content of 64% wt.

The fish oil, with the emulsifier, constituted 26 weight-% of the mixture. The mixture was homogenised so that at least 95% of the fat globules in the emulsion had a diameter of maximum 10 micrometers (FIG. 1).

EXAMPLE 2

An emulsion was produced as described in Example 1, but where the fish oil, with the emulsifier, constituted 45 weight-% of the mixture. The mixture was also homogenised so that at least 95% of the fat globules had a diameter of maximum 10 micrometers (FIG. 2).

A tasting panel, comprising persons trained in the testing of fish oils, could not register the taste of fish oil in either of the emulsions of Examples 1 and 2, even when they had been stored in plastic bottles at approximately 5° C. for over 4 months. Even after repeated exposure to air and subsequent storage, the taste did not change. Furthermore, no indications were registered of the emulsions separating over the above-mentioned period for both Examples.

The emulsions of Examples 1 and 2 were prepared by adding to the fish oil 10% wt lecithin (Sternphil E-60), then thoroughly mixing with concentrated orange juice (64% dry matter from Tine Meieri, Bergen, Norway), 0.1% wt potassium sorbate and 0.1% wt sodium benzoate, and finally homogenizing at 350 to 600 bar in a Rannie two-stage homogenizer.

EXAMPLE 3

60 parts by weight apple juice concentrate (64% dry matter), 30 parts by weight refined fish oil (Denomega from Denofa, Fredrikstad, Norway), 10 parts by weight lecithin (Sternphil E-60 available from MultiChem Wallinco, Oslo, Norway), 0.1 parts by weight sodium benzoate and 0.1 parts by weight potassium sorbate were subjected to vigorous shaking for two minutes in a closed container at ambient temperature and pressure. The mixture was then homogenized in a two stage homogenizer at 350 bar for 90 seconds at ambient temperature. The resulting emulsion had moderate viscosity and no smell or taste of fish.

EXAMPLE 4

60 parts by weight of tomato juice concentrate, 30 parts by weight refined fish oil (Denomega), 10 parts by weight lecithin (Sternphil E-60 available from MultiChem Wallinco, Oslo, Norway), 0.1 parts by weight sodium benzoate and 0.1 parts by weight potassium sorbate were subjected to vigorous shaking for two minutes in a closed container at ambient temperature and pressure. The mixture was then homogenized in a two stage homogenizer at 350 bar for 90 seconds at ambient temperature. The finished product had no fishy smell or taste but was of paste-like consistency. Dilution 1:1 (by volume) gave a pourable, readily consumable product.

EXAMPLE 5

60 parts by weight of blueberry juice concentrate, 30 parts by weight refined fish oil (Denomega), 10 parts by weight lecithin (Sternphil E-60 available from MultiChem Wallinco, Oslo, Norway), 0.1 parts by weight sodium benzoate and 0.1 parts by weight potassium sorbate were subjected to vigorous shaking for two minutes in a closed container at ambient temperature and pressure. The mixture was then homogenized in a two stage homogenizer at 350 bar for 90 seconds at ambient temperature. The resulting emulsion had low viscosity and no smell or taste of fish.

EXAMPLE 6

Emulsion Containing CLA (Conjugated Linoleic Acid)

6200 g of an orange juice concentrate (from Tine Meieri, Norway), was mixed with 2000 g of conjugated linoleic acid in triacyl glycerol form (supplied by Natural ASA, Hovdebygda, Norway), 200 g of lecithin (Sternphil E-60, from Multichem Wallinco, Oslo, Norway), 8 g of potassium sorbate and 8 g of sodium benzoate. After homogenization by shaking of the container, the mixture was homogenized at room temperature in a Rannie two stage homogenizer for 3 minutes at 450 bar. The emulsion obtained was more viscous than that obtained from a similar experiment using fish oil.

The invention claimed is:

1. An edible oil-in-water emulsion concentrate comprising an emulsifier and as a continuous aqueous phase a physiologically tolerable plant juice concentrate in the form of a pourable liquid and a discontinuous phase comprising a physiologically tolerable, oxidation-labile, unsaturated lipid or fatty acid, wherein:
  a) at least 95% by number of the droplets of said discontinuous phase have a particle diameter of no more than 10 micrometres;
  b) the aqueous phase has a dry solids content of at least 40% wt.; and
  c) the aqueous phase has a plant-derived dissolved matter content of at least 80% wt. of the total dissolved matter in the aqueous phase.

2. An emulsion concentrate as claimed claim 1 containing in the lipid phase at least one lipid selected from the group consisting of omega-3, omega-6 and omega-9 polyunsaturated fatty acids and esters thereof.

3. An emulsion concentrate as claimed in claim 1 containing fish oil.

4. An emulsion concentrate as claimed in claim 1 containing conjugated linoleic acid or an ester thereof.

5. An emulsion concentrate as claimed in claim 1 containing at least 20% wt of lipid phase.

6. An emulsion concentrate as claimed in claim 1 containing up to 80% wt of lipid phase.

7. An emulsion concentrate as claimed in claim 1 containing a lecithin as said emulsifier.

8. An emulsion concentrate as claimed in claim 1 wherein said plant juice concentrate is orange juice concentrate.

9. An emulsion concentrate as claimed in claim 1 produced by emulsification under a pressure of at least 50 bar.

10. An emulsion concentrate as claimed in claim 1 produced by emulsification under a pressure of at least 200 bar.

11. An emulsion concentrate as claimed in claim 1 produced by emulsification under a pressure of at least 500 bar.

12. An emulsion concentrate as claimed in claim 1 further comprising fish protein hydrolysate.

13. A sealed container containing a concentrate as claimed in claim 1.

14. A method for preparing a lipid containing, ready-to-drink plant juice composition comprising diluting a concentrate according to claim 1.

15. A sealed container containing a ready-to-drink plant juice composition as claimed in claim 14.

16. A foodstuff containing or produced using a concentrate according to claim 1.

* * * * *